United States Patent [19]
Jameson

[11] Patent Number: 6,036,467
[45] Date of Patent: Mar. 14, 2000

[54] APPARATUS FOR ULTRASONICALLY ASSISTED MELT EXTRUSION OF FIBERS

[75] Inventor: Lee Kirby Jameson, Roswell, Ga.

[73] Assignee: Kimberly-Clark Worldwide, Inc., Neenah, Wis.

[21] Appl. No.: 08/992,862

[22] Filed: Nov. 25, 1997

Related U.S. Application Data

[63] Continuation of application No. 08/721,773, Sep. 25, 1996, abandoned, which is a continuation of application No. 08/264,548, Jun. 23, 1994, abandoned.

[51] Int. Cl.$^7$ .................................................. B28B 17/00
[52] U.S. Cl. ........................ 425/174.2; 425/564; 425/567
[58] Field of Search .................................. 428/364, 174, 428/174.2, 564, 567, 570; 264/23, 70, 174; 524/577, 582, 585

[56] References Cited

U.S. PATENT DOCUMENTS

| | | | |
|---|---|---|---|
| 3,016,599 | 1/1962 | Perry, Jr. ..................................... | 28/78 |
| 3,042,481 | 7/1962 | Coggeshall .................................. | 18/54 |
| 3,194,855 | 7/1965 | Jones et al. ................................. | 264/70 |
| 3,203,215 | 8/1965 | Jones ........................................... | 72/253 |
| 3,233,012 | 2/1966 | Bodine, Jr. .................................. | 264/23 |
| 3,285,442 | 11/1966 | Tigner ......................................... | 264/70 |
| 3,341,394 | 9/1967 | Kinney ........................................ | 161/72 |
| 3,619,429 | 11/1971 | Torigai ........................................ | 264/174 |

(List continued on next page.)

FOREIGN PATENT DOCUMENTS

| | | |
|---|---|---|
| 0202844 | 11/1986 | European Pat. Off. . |
| 0235603 | 9/1987 | European Pat. Off. . |
| 0303998 | 2/1989 | European Pat. Off. . |
| 0644280 | 3/1995 | European Pat. Off. . |
| 134 052 | 2/1979 | Germany . |

(List continued on next page.)

OTHER PUBLICATIONS

V.A. Wente, "Superfine Thermoplastic Fibers", *Industrial & Engin. Chem.*, v. 48, N. 8, pp. 1342–1346. Naval Res. Lab., Wash., D.C.

V.A. Wente, "Manufacturing of Superfine Organic Fiber" Naval Res. Lab., Washington, D.C., May 25, 1954, NRL Rpt. 4364 (111437).

R.R. Butin, et al., "Melt Blowing—A One-Step Web Process For Nonwoven Products", *Journal of the Technical Assoc. of the Pulp & Paper Industry*, V.56, N.4, pp. 74–77.

*Primary Examiner*—Merrick Dixon
*Attorney, Agent, or Firm*—Karl V. Sidor

[57] ABSTRACT

An apparatus and a method for the melt extrusion of a molten thermoplastic polymer, e.g., as fibers and nonwoven webs, which apparatus and method utilize ultrasonic energy to assist in the melt-extrusion process. The apparatus includes a die housing which defines a chamber adapted to receive the molten thermoplastic polymer and a means for applying ultrasonic energy to a portion of the molten thermoplastic polymer. The die housing includes a chamber adapted to receive the molten thermoplastic polymer, an inlet orifice adapted to supply the chamber with the molten thermoplastic polymer, and an extrusion orifice adapted to receive the molten thermoplastic polymer from the chamber and extrude the polymer. The means for applying ultrasonic energy is located within the chamber. The method involves supplying a molten thermoplastic polymer and extruding the molten thermoplastic polymer through an extrusion orifice in the foregoing apparatus to form a threadline. The means for applying ultrasonic energy is at least partially surrounded by molten thermoplastic polymer and is adapted to apply the ultrasonic energy to molten thermoplastic polymer as it passes into the extrusion orifice. While extruding the molten thermoplastic polymer, the means for applying ultrasonic energy is excited with ultrasonic energy. The resulting threadline then is attenuated to form a fiber. The means for applying the ultrasonic energy may be an ultrasonic horn.

21 Claims, 5 Drawing Sheets

U.S. PATENT DOCUMENTS

| | | | |
|---|---|---|---|
| 3,655,862 | 4/1972 | Dorschner et al. | 264/290 |
| 3,692,618 | 9/1972 | Dorschner et al. | 161/72 |
| 3,704,198 | 11/1972 | Prentice | 161/148 |
| 3,705,068 | 12/1972 | Dobo et al. | 156/441 |
| 3,755,527 | 8/1973 | Keller et al. | 264/210 |
| 3,802,817 | 4/1974 | Matsuki et al. | 425/66 |
| 3,849,241 | 11/1974 | Butin et al. | 161/169 |
| 3,853,651 | 12/1974 | Porte | 156/73.6 |
| 3,978,185 | 8/1976 | Butin et al. | 264/93 |
| 4,064,605 | 12/1977 | Akiyama et al. | 28/103 |
| 4,091,140 | 5/1978 | Harmon | 428/288 |
| 4,100,319 | 7/1978 | Schwartz | 428/171 |
| 4,100,324 | 7/1978 | Anderson et al. | 428/288 |
| 4,118,531 | 10/1978 | Hauser | 428/224 |
| 4,239,720 | 12/1980 | Gerlach et al. | 264/147 |
| 4,340,563 | 7/1982 | Appel et al. | 264/518 |
| 4,405,297 | 9/1983 | Appel et al. | 425/72 |
| 4,434,204 | 2/1984 | Hartman et al. | 428/198 |
| 4,500,280 | 2/1985 | Astier et al. | 425/564 |
| 4,526,733 | 7/1985 | Lau | 264/12 |
| 4,627,811 | 12/1986 | Greiser et al. | 425/72 |
| 4,644,045 | 2/1987 | Fowells | 526/348 |
| 4,663,220 | 5/1987 | Wisneski et al. | 428/221 |
| 4,793,954 | 12/1988 | Lee et al. | |
| 5,017,311 | 5/1991 | Furusawa et al. | |
| 5,068,068 | 11/1991 | Furusawa et al. | 264/23 |
| 5,160,746 | 11/1992 | Dodge, II et al. | 425/7 |
| 5,269,981 | 12/1993 | Jameson et al. | 264/23 |

FOREIGN PATENT DOCUMENTS

| | | |
|---|---|---|
| 138 523 | 11/1979 | Germany . |
| 3912524 | 11/1989 | Germany . |
| 3912524A1 | 11/1989 | Germany . |
| 49-133613 | 12/1974 | Japan . |
| 49133613A | 12/1974 | Japan . |
| 56-144214 | 11/1981 | Japan . |
| 57-51441 | 3/1982 | Japan . |
| 57-078967 | 5/1982 | Japan . |
| 57-099327 | 9/1982 | Japan . |
| 386 977 | 5/1972 | Russian Federation . |
| 532529 | 5/1975 | Russian Federation . |
| 532 529 | 5/1977 | Russian Federation . |
| 706250 | 7/1978 | Russian Federation . |
| 706 250 | 12/1979 | Russian Federation . |
| 865707 | 4/1961 | United Kingdom . |

APPARATUS FOR ULTRASONICALLY ASSISTED MELT EXTRUSION OF FIBERS

This application is a continuation of application Ser. No. 08/721,773 entitled "Apparatus For Ultrasonically Assisted Melt Extrusion of Fibers" and filed in the U.S. Patent and Trademark Office on Sep. 25, 1996, now abandoned. The entirety of this application is hereby incorporated by reference which application is a continuation application of application Ser. No. 08/264,548 entitled "Apparatus for Ultrasonically Assisted Melt Extrusion of Fibers", filed in the U.S. Patent and Trademark Office on Jun. 23, 1994, now abandoned.

BACKGROUND OF THE INVENTION

The present invention relates to the melt extrusion of a thermoplastic polymer.

The melt extrusion of a thermoplastic polymer to form fibers and nonwoven webs generally involves forcing a molten polymer through a plurality of orifices to form a plurality of molten threadlines, contacting the molten threadlines with a fluid, usually air, directed so as to form filaments or fibers and attenuate them. The attenuated filaments or fibers then are randomly deposited on a surface to form a nonwoven web.

The more common and well known processes utilized for the preparation of nonwoven webs are meltblowing, coforming, and spunbonding.

Meltblowing references include, by way of example, U.S. Pat. Nos. 3,016,599 to Perry, Jr., 3,704,198 to Prentice, 3,755,527 to Keller et al., 3,849,241 to Butin et al., 3,978,185 to Butin et al., and 4,663,220 to Wisneski et al. See, also, V. A. Wente, "Superfine Thermoplastic Fibers", *Industrial and Engineering Chemistry*, Vol. 48, No. 8, pp. 1342–1346 (1956); V. A. Wente et al., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing—A One-Step Web Process for New Nonwoven Products", *Journal of the Technical Association of the Pulp and Paper Industry*, Vol. 56, No.4, pp. 74–77 (1973).

Coforming references (i.e., references disclosing a meltblowing process in which fibers or particles are commingled with the meltblown fibers as they are formed) include U.S. Pat. Nos. 4,100,324 to Anderson et al. and 4,118,531 to Hauser.

Finally, spunbonding references include, among others, U.S. Pat. Nos. 3,341,394 to Kinney, 3,655,862 to Dorschner et al., 3,692,618 to Dorschner et al., 3,705,068 to Dobo et al., 3,802,817 to Matsuki et al., 3,853,651 to Porte, 4,064,605 to Akiyama et al., 4,091,140 to Harmon, 4,100,319 to Schwartz, 4,340,563 to Appel and Morman, 4,405,297 to Appel and Morman, 4,434,204 to Hartman et al., 4,627,811 to Greiser and Wagner, and 4,644,045 to Fowells.

Some of the difficulties or problems routinely encountered with melt extrusion processes are, by way of illustration only, thermal degradation of the polymer, plugging of extrusion dies, and limitations on fiber diameters, throughput, and production rates or line speeds. Fiber diameters generally are a function of the diameter of the orifices through which the polymer is extruded, although the temperature and velocity of the attenuating fluid can have a significant effect. For some applications, fiber diameters of less than about 10 micrometers are desired. Throughput primarily is a function of the melt flow rate of the polymer, while production rates depend in large measure upon throughput. In other words, throughput and production rates generally are dependent upon the viscosity of the molten polymer being extruded. The difficulties and problems just described result largely from efforts to manipulate melt viscosity to achieve desired throughput and/or production rates. Accordingly, there are opportunities for improvements in melt extrusion processes based on improved melt viscosity control.

SUMMARY OF THE INVENTION

The present invention addresses some of the difficulties and problems discussed above by providing an apparatus and a method for the melt extrusion of a thermoplastic polymer, e.g., as fibers and nonwoven webs, which apparatus and method utilize ultrasonic energy to assist in the melt-extrusion process. The apparatus includes a die housing and a means for applying ultrasonic energy to a portion of the molten thermoplastic polymer. The die housing defines a chamber adapted to receive the molten thermoplastic polymer, an inlet orifice adapted to supply the chamber with the molten thermoplastic polymer, and an extrusion orifice adapted to receive the molten thermoplastic polymer from the chamber and extrude the polymer. The means for applying ultrasonic energy is located within the chamber.

In one aspect of the present invention, the die housing has a first end and a second end and the extrusion orifice is adapted to receive the molten thermoplastic polymer from the chamber and extrude the polymer along a first axis. The means for applying ultrasonic energy to a portion of the molten thermoplastic polymer is an ultrasonic horn having a first end and a second end. The horn is adapted, upon excitation by ultrasonic energy, to have a node and a longitudinal mechanical excitation axis. The horn is located in the second end of the die housing in a manner such that the first end of the horn is located outside of the die housing and the second end is located inside the die housing, within the chamber, and is in close proximity to the extrusion orifice.

The molten thermoplastic polymer may be extruded as, by way of example, a fiber. In such case, the longitudinal excitation axis of the ultrasonic horn desirably will be substantially parallel with the first axis. Furthermore, the second end of the horn desirably will have a cross-sectional area approximately the same as or less than a minimum area which encompasses all extrusion orifices in the die housing.

The present invention contemplates the use of an ultrasonic horn having a vibrator means coupled to the first end of the horn. Typically, the vibrator means will be a piezoelectric transducer. The transducer may be coupled directly to the horn or by means of an elongated waveguide. The elongated waveguide may have any desired input:output mechanical excitation ratio, although ratios of 1:1 and 1:2.5 are typical for many applications. The ultrasonic energy typically will have a frequency of from about 18 kHz to about 60 kHz.

The present invention also contemplates a method of forming a fiber. The method involves supplying a molten thermoplastic polymer and extruding the polymer through an extrusion orifice in a die assembly to form a threadline. The die assembly will be a die housing and a means for applying ultrasonic energy to a portion of the molten thermoplastic polymer as already defined. The means for applying ultrasonic energy is at least partially surrounded by the molten thermoplastic polymer and is adapted to apply the ultrasonic energy to the molten thermoplastic polymer as it passes into the extrusion orifice. While extruding the molten thermoplastic polymer, the means for applying ultrasonic energy is excited with ultrasonic energy. The threadline which emerges from the extrusion orifice then is attenuated to form a fiber.

The present invention further contemplates a method of forming from a thermoplastic polymer a fiber having entrapped along the length thereof bubbles of a gas. This method also involves supplying a molten thermoplastic polymer and extruding the polymer through an extrusion orifice in a die assembly to form a threadline. The die assembly may be a die assembly and an ultrasonic horn for applying ultrasonic energy to a portion of the molten thermoplastic polymer as already defined. While extruding the molten thermoplastic polymer, the ultrasonic horn is excited with ultrasonic energy under conditions sufficient to maintain cavitation. The threadline which emerges from the extrusion orifice then is attenuated to form a fiber.

Cavitation results in the formation of bubbles of a gas within the threadline, which bubbles remain entrapped. Attenuation to form a fiber elongates, but does not destroy, the bubbles. Because of the presence of the bubbles, the density of the fiber is less than that of an otherwise identical fiber lacking the entrapped bubbles of gas. As an example, the density of a fiber containing bubbles of a gas may be less than about 90 percent of the density of an otherwise identical fiber lacking the entrapped bubbles of gas. As another example, the density of the fiber may be in a range of from about 20 to about 90 percent of the density of an otherwise identical fiber lacking the entrapped bubbles of gas.

DETAILED DESCRIPTION OF THE INVENTION

Figure 1:
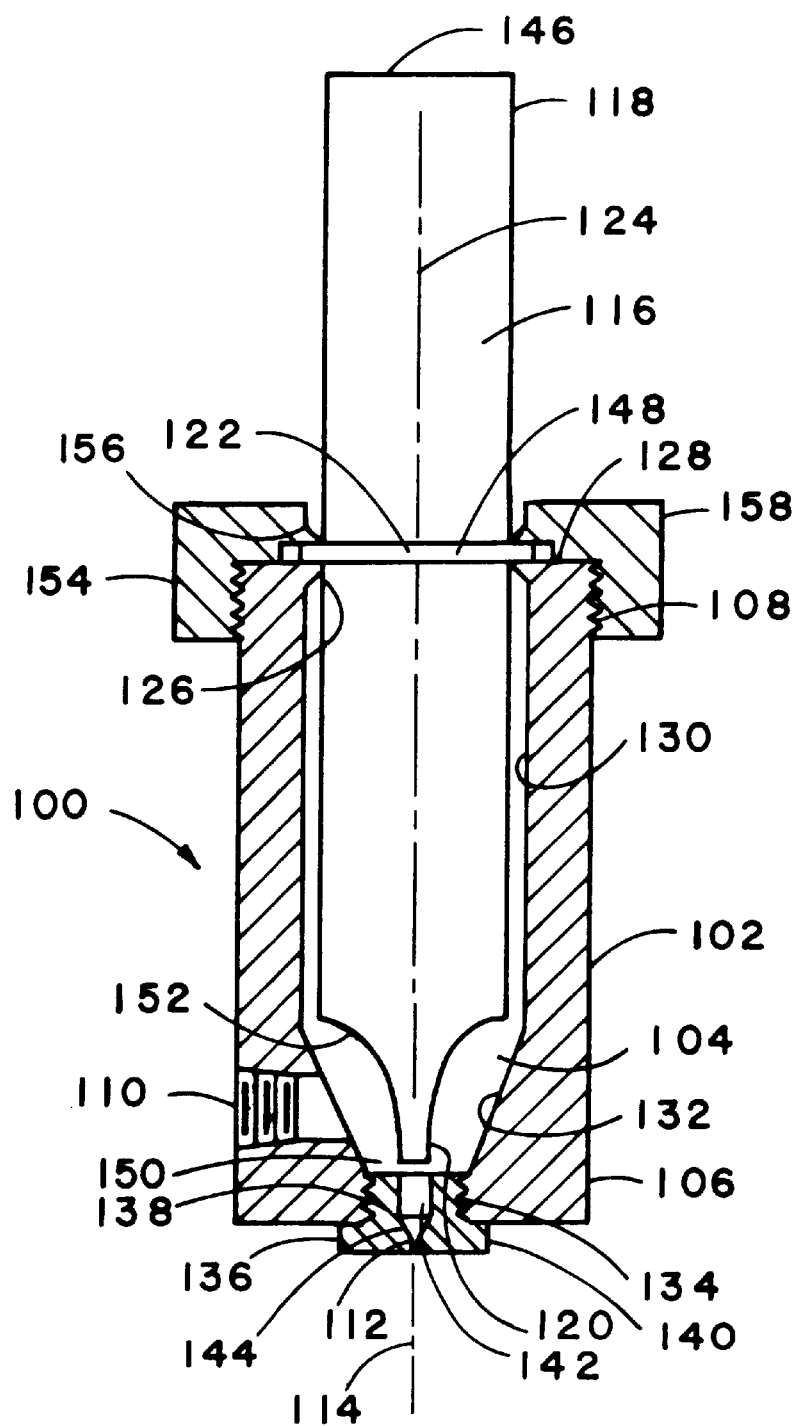
FIG. 1 is a diagrammatic cross-sectional representation of one embodiment of the apparatus of the present invention.

As used herein, the term "thermoplastic polymer" is meant to include any thermoplastic polymer which is capable of being melt extruded. The term also is meant to include blends of two or more polymers and alternating, random, and block copolymers. Examples of thermoplastic polymers include, by way of illustration only, end-capped polyacetals, such as poly(oxymethylene) or polyformaldehyde, poly(trichloroacetaldehyde), poly(n-valeraldehyde), poly(acetaldehyde), poly(propionaldehyde), and the like; acrylic polymers, such as polyacrylamide, poly(acrylic acid), poly(methacrylic acid), poly(ethyl acrylate), poly(methyl methacrylate), and the like; fluorocarbon polymers, such as poly(tetrafluoroethylene), perfluorinated ethylene-propylene copolymers, ethylene-tetrafluoroethylene copolymers, poly(chlorotrifluoroethylene), ethylene-chlorotrifluoroethylene copolymers, poly(vinylidene fluoride), poly(vinyl fluoride), and the like; polyamides, such as poly(6-aminocaproic acid) or poly(caprolactam), poly(hexamethylene adipamide), poly(hexamethylene sebacamide), poly(11-aminoundecanoic acid), and the like; polyaramides, such as poly(imino-1,3-phenyleneiminoisophthaloyl) or poly(m-phenylene isophthalamide), and the like; parylenes, such as poly-p-xylylene, poly(chloro-p-xylylene), and the like; polyaryl ethers, such as poly(oxy-2,6-dimethyl-1,4-phenylene) or poly(p-phenylene oxide), and the like; polyaryl sulfones, such as poly(oxy-1,4-phenylenesulfonyl-1,4-phenyleneoxy-1,4-phenylene-isopropylidene-1,4-phenylene), poly(sulfonyl-1,4-phenyleneoxy-1,4-phenylenesulfonyl-4,4'-biphenylene), and the like; polycarbonates, such as poly(bisphenol A) or poly(carbonyldioxy-1,4-phenyleneisopropylidene-1,4-phenylene), and the like; polyesters, such as poly(ethylene terephthalate), poly(tetramethylene terephthalate), poly(cyclohexylene-1,4-dimethylene terephthalate) or poly(oxymethylene-1,4-cyclohexylene-methyleneoxyterephthaloyl), and the like; polyaryl sulfides, such as poly(p-phenylene sulfide) or poly(thio-1,4phenylene), and the like; polyimides, such as poly(pyromellitimido-1,4-phenylene), and the like; polyolefins, such as polyethylene, polypropylene, poly(1-butene), poly(2-butene), poly(1-pentene), poly(2-pentene), poly(3-methyl-1-pentene), poly(4methyl-1-pentene), 1,2-poly-1,3-butadiene, 1,4-poly-1,3-butadiene, polyisoprene, polychloroprene, polyacrylonitrile, poly(vinyl acetate), poly(vinylidene chloride), polystyrene, and the like; copolymers of the foregoing, such as acrylonitrile-butadiene-styrene (ABS) copolymers, and the like; and the like.

By way of example, the thermoplastic polymer may be a polyolefin, examples of which are listed above. As a further example, the thermoplastic polymer may be a polyolefin which contains only hydrogen and carbon atoms and which is prepared by the addition polymerization of one or more unsaturated monomers. Examples of such polyolefins include, among others, polyethylene, polypropylene, poly(1-butene), poly(2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polystyrene, and the like, as well as blends of two or more such polyolefins and alternating, random, and block copolymers prepared from two or more different unsaturated monomers.

As used herein, the term "node" means the point on the longitudinal excitation axis of the ultrasonic horn at which no longitudinal motion of the horn occurs upon excitation by ultrasonic energy. The node sometimes is referred in the art, as well as in this specification, as the nodal point.

The term "close proximity" is used herein in a qualitative sense only. That is, the term is used to mean that the means for applying ultrasonic energy is sufficiently close to the extrusion orifice to apply the ultrasonic energy primarily to the molten thermoplastic polymer passing into the extrusion orifice. The term is not used in the sense of defining specific distances from the extrusion orifice.

The apparatus of the present invention includes a die housing and a means for applying ultrasonic energy to a portion of the molten thermoplastic polymer. The die housing defines a chamber adapted to receive the molten thermoplastic polymer, an inlet orifice adapted to supply the chamber with the molten thermoplastic polymer; and an extrusion orifice adapted to receive the molten thermoplastic polymer from the chamber and extrude the polymer. The means for applying ultrasonic energy is located within the chamber.

One aspect of the present invention, in which the molten thermoplastic polymer is extruded is a fiber, is shown in FIG. 1. In FIG. 1, the apparatus 100 includes a die housing 102 which defines a chamber 104 adapted to receive the molten thermoplastic polymer. The die housing 102 has a first end 106 and a second end 108. The die housing 102 also has an inlet orifice 110 adapted to supply the chamber 104 with the molten thermoplastic polymer. An extrusion orifice 112 is located in the first end 106 of the die housing 102; it is adapted to receive the molten thermoplastic polymer from the chamber 102 and extrude the polymer along a first axis 114. An ultrasonic horn 116 is located in the second end 108 of the die housing 102. The ultrasonic horn has a first end 118 and a second end 120. The horn 116 is located in the second end 108 of the die housing 102 in a manner such that the first end 118 of the horn 116 is located outside of the die housing 102 and the second end 118 of the horn 116 is located inside the die housing 102, within the chamber 104, and is in close proximity to the extrusion orifice 112. The horn 116 is adapted, upon excitation by ultrasonic energy, to have a nodal point 122 and a longitudinal mechanical excitation axis 124. Desirably, the first axis 114 and the mechanical excitation axis 124 will be substantially parallel. More desirably, the first axis 114 and the mechanical excitation axis 124 will substantially coincide, as shown in FIG. 1.

The size and shape of the apparatus of the present invention can vary widely, depending, at least in part, on the number and arrangement of extrusion orifices and the operating frequency of the means for applying ultrasonic energy. For example, the die housing may be cylindrical, rectangular, or any other shape. Moreover, the die housing may have a single extrusion orifice or a plurality of extrusion orifices. A plurality of extrusion orifices may be arranged, for example, linearly or in a circular pattern.

The means for applying ultrasonic energy is located within the chamber, typically at least partially surrounded by the molten thermoplastic polymer. Such means is adapted to apply the ultrasonic energy to the molten thermoplastic polymer as it passes into the extrusion orifice. Stated differently, such means is adapted to apply ultrasonic energy to a portion of the molten thermoplastic polymer in the vicinity of each extrusion orifice. Such means may be located completely or partially within the chamber.

When the means for applying ultrasonic energy is an ultrasonic horn, the horn conveniently extends through the die housing, such as through the first end of the housing as identified in FIG. 1. However, the present invention comprehends other configurations. For example, the horn may extend through a wall of the die housing, rather than through an end. Moreover, neither the first axis nor the longitudinal excitation axis of the horn need to be vertical. If desired, the longitudinal mechanical excitation axis of the horn may be at an angle to the first axis. Nevertheless, the longitudinal mechanical excitation axis of the ultrasonic horn desirably will be substantially parallel with the first axis. More desirably, the longitudinal mechanical excitation axis of the ultrasonic horn desirably and the first axis will substantially coincide, as shown in FIG. 1.

If desired, more than one means for applying ultrasonic energy may be located within the chamber defined by the die housing. Moreover, a single means may apply ultrasonic energy to the portion of the molten thermoplastic polymer which is in the vicinity of one or more extrusion orifices.

The application of ultrasonic energy to a plurality of extrusion orifices may be accomplished by a variety of methods. For example, with reference again to the use of an ultrasonic horn, the second end of the horn may have a cross-sectional area which is sufficiently large so as to apply ultrasonic energy to the portion of the molten thermoplastic polymer which is in the vicinity of all of the extrusion orifices in the die housing. In such case, the second end of the ultrasonic horn desirably will have a cross-sectional area approximately the same as or less than a minimum area which encompasses all extrusion orifices in the die housing. Alternatively, the second end of the horn may have a plurality of protrusions, or tips, equal in number to the number of extrusion orifices. In this instance, the cross-sectional area of each protrusion or tip desirably will be approximately the same as or less than the cross-sectional area of the extrusion orifice with which the protrusion or tip is in close proximity.

As already noted, the term "close proximity" is used herein to mean that the means for applying ultrasonic energy is sufficiently close to the extrusion orifice to apply the ultrasonic energy primarily to the molten thermoplastic polymer passing into the extrusion orifice. The actual distance of the means for applying ultrasonic energy from the extrusion orifice in any given situation will depend upon a number of factors, some of which are the melt flow rate of the thermoplastic polymer, the cross-sectional area of the end of the means for applying the ultrasonic energy relative to the cross-sectional area of the extrusion orifice, the frequency of the ultrasonic energy, the gain of the means for applying the ultrasonic energy (e.g., the magnitude of the longitudinal mechanical excitation of the means for applying ultrasonic energy), the temperature of the molten thermoplastic polymer, and the rate of extrusion.

In general, the distance of the means for applying ultrasonic energy from the extrusion orifice in a given situation may be determined readily by one having ordinary skill in the art without undue experimentation. In practice, such distance will be in the range of from about 0.002 inch (about 0.05 mm) to about 1.3 inches (about 33 mm), although greater distances can be employed. Such distance determines the extent to which ultrasonic energy is applied to thermoplastic polymer other than that which is about to enter the extrusion orifice; i.e., the greater the distance, the greater the amount of thermoplastic polymer which is subjected to ultrasonic energy. Consequently, shorter distances generally are desired in order to minimize degradation of the polymer and other adverse effects which may result from exposure of the polymer to the ultrasonic energy.

The method of forming a fiber from a thermoplastic polymer as contemplated by the present invention first involves supplying a molten thermoplastic polymer and extruding it through an extrusion orifice in a die assembly to form a threadline. The die assembly is the apparatus already described. The means for applying ultrasonic energy is at least partially surrounded by the molten thermoplastic polymer and is adapted to apply the ultrasonic energy to the molten thermoplastic polymer as it passes into the extrusion orifice. While the molten thermoplastic polymer is being extruded, the means for applying ultrasonic energy is excited with ultrasonic energy. The extruded threadline then is attenuated to form a fiber.

In general, the process of supplying a molten thermoplastic polymer, extruding the polymer, and attenuating the threadline resulting from extruding the polymer all are carried out in accordance with procedures and practices which are well known to those having ordinary skill in the art. For example, attenuation of the threadline to form a fiber can be accomplished mechanically or by entraining the fiber in a fluid. The latter typically will be used when the fiber is to be formed into a nonwoven web. That is, formation of the fiber into a nonwoven web involves contacting the threadline with a fluid stream to attenuate the threadline and form it into a fiber. The attenuated threadline, or fiber, then is randomly deposited on a collecting surface.

Nonwoven webs also can be prepared by extruding the molten thermoplastic polymer as a continuous threadline, attenuating the threadline mechanically, gathering a plurality of attenuated threadlines into a tow, cutting the tow into staple fibers (with or without additional processing such as crimping, false twisting, or the like), and carding the staple fibers into a nonwoven web which subsequently is bonded by known means.

Under certain conditions, the application of ultrasonic energy to a portion of the thermoplastic polymer, i.e., the portion of the thermoplastic polymer passing into the extrusion orifice, can lead to the formation of bubbles of a gas in the extruded threadline. The bubbles remain as the threadline cools and, as a consequence, become entrapped. Upon attenuation of the threadline, the bubbles become extended, or stretched.

In general, the bubbles of a gas are formed in the extruded threadline under conditions which are sufficient to maintain cavitation. Cavitation is a known phenomenon which occurs in liquids in a strong ultrasonic field. In liquids, cavitation pertains to formation in a liquid of gaseous and vapor bubbles which expand and contract in response to high frequency alternating pressure of the sound field. However, the formation of bubbles in the molten thermoplastic polymer was surprising in view of the very high vapor pressure and relatively high viscosity of the molten polymer.

Cavitation of the molten thermoplastic polymer appears to be a function of the level of ultrasonic excitation and the rate of flow of the molten thermoplastic polymer into the extrusion orifice. For example, at a given rate of flow, or throughput, cavitation usually can be induced by increasing the level of ultrasonic excitation, although there typically is a flow rate above which cavitation cannot be induced.

Because of the presence of gas bubbles in the fiber, the fiber has a density which is less than that of an otherwise identical fiber lacking the entrapped bubbles of gas. For example, the density of such fiber may be less than about 90 percent of the density of an otherwise identical fiber lacking the entrapped bubbles of gas. As a further example, the density of such fiber may be in a range of from about 20 to about 90 percent of the density of an otherwise identical fiber lacking the entrapped bubbles of gas.

The present invention is further described by the examples which follow. Such examples, however, are not to be construed as limiting in any way either the spirit or the scope of the present invention. As used in the examples, the term "melt flow rate" means the melt flow rate as measured in accordance with ASTM Method D-1238. The term "flow rate" is used to identify the experimentally determined rate of flow of molten polymer through an extrusion orifice in an apparatus of the present invention.

EXAMPLE 1

The polymer employed was a polypropylene having a melt flow rate of 400 grams per 10 minutes, or g/10 min. (Himont HH-441, Himont Company, Wilmington, Del.) having no melt processing additives. The polymer was melted in a constant pressure batch extruder manufactured by Alex James and Associates, Greenville, S.C. The principal components of the extruder consisted of a pressure barrel, approximately 3 inches (about 80 mm) in length with an axial bore of 1.0 inch (about 25 mm) diameter. A pressurizing piston of 1.0 inch (about 25 mm) diameter and approximately 4 inches (about 100 mm) in length was fitted into the end of the barrel and sealed by a packing gland. The opposite end of the barrel was fitted with a flange secured by bolts which accommodated a filter and seal, and provided a means for connecting piping to the outlet of the barrel assembly. In operation, the barrel assembly was heated by clamping it within a jacket of imbedded cartridge heaters. The barrel temperature was sensed by a thermocouple that was in contact with the outer surface of the barrel. The molten charge in the barrel was pressurized by forcing the piston into the barrel. This force was provided by a hydraulic ram. System pressure was monitored by a pressure gauge on the hydraulic line to the ram.

As the piston was forced into the reservoir under constant pressure, molten polymer exited through an outlet in the other end of the reservoir into an approximately 4-inch (about 10-cm) length of ¼-inch (about 6.4-mm) diameter stainless steel tubing. The tubing was connected to the inlet orifice of an apparatus of the present invention as shown in FIG. 1.

Again with reference to FIG. 1, the die housing 102 of the apparatus was a cylinder having an outer diameter of 1.375 inches (about 34.9 mm), an inner diameter of 0.875 inch (about 22.2 mm), and a length of 3.086 inches (about 78.4 mm). The outer 0.312-inch (about 7.9-mm) portion of the second end 108 of the die housing was threaded with 16-pitch threads. The inside of the second end had a beveled edge 126, or chamfer, extending from the face 128 of the second end toward the first end 106 a distance of 0.125 inch (about 3.2 mm). The chamfer reduced the inner diameter of the die housing at the face of the second end to 0.75 inch (about 19.0 mm). An inlet orifice 110 was drilled in the die housing, the center of which was 0.688 inch (about 17.5 mm) from the first end, and tapped. The inner wall of the die housing consisted of a cylindrical portion 130 and a conical frustrum portion 132. The cylindrical portion extended from the chamfer at the second end toward the first end to within 0.992 inch (about 25.2 mm) from the face of the first end. The conical frustrum portion extended from the cylindrical portion a distance of 0.625 inch (about 15.9 mm), terminating at a threaded opening 134 in the first end. The diameter of the threaded opening was 0.375 inch (about 9.5 mm); such opening was 0.367 inch (about 9.3 mm) in length.

A die tip was 136 located in the threaded opening of the first end. The die tip consisted of a threaded cylinder 138 having a circular shoulder portion 140. The shoulder portion was 0.125 inch (about 3.2 mm) thick and had two parallel faces (not shown) 0.5 inch (about 12.7 mm) apart. An extrusion orifice 112 was drilled in the shoulder portion and extended toward the threaded portion a distance of 0.087 inch (about 2.2 mm). The diameter of the extrusion orifice was 0.0145 inch (about 0.37 mm). The extrusion orifice terminated within the die tip at a vestibular portion 142 having a diameter of 0.125 inch (about 3.2 mm) and a conical frustrum portion 144 which joined the vestibular portion with the extrusion orifice. The wall of the conical frustrum portion was at an angle of 30° from the vertical. The vestibular portion extended from the extrusion orifice to the end of the threaded portion of the die tip, thereby connecting the chamber defined by the die housing with the extrusion orifice.

The means for applying ultrasonic energy was a cylindrical ultrasonic horn 116. The horn was machined to resonate at a frequency of 20 kHz. The horn had a length of 5.198 inches (about 132.0 mm), which was equal to one-half of the resonating wavelength, and a diameter of 0.75 inch (about 19.0 mm). The face 146 of the first end 118 of the horn was drilled and tapped for a ⅜-inch (about 9.5-mm) stud (not shown). The horn was machined with a collar 148 at the nodal point 122. The collar was 0.094-inch (about 2.4-mm) wide and extended outwardly from the cylindrical surface of the horn 0.062 inch (about 1.6 mm). Thus, the diameter of the horn at the collar was 0.875 inch (about 22.2 mm). The second end 120 of the horn terminated in a small cylindrical tip 150 0.125 inch (about 3.2 mm) long and 0.125 inch (about 3.2 mm) in diameter. Such tip was separated from the cylindrical body of the horn by a parabolic frustrum portion 152 approximately 0.5 inch (about 13 mm) in length. That is, the curve of this frustrum portion as seen in cross-section was parabolic in shape. The face of the small cylindrical tip was normal to the cylindrical wall of the horn and was located about 0.4 inch (about 10 mm) from the extrusion orifice. Thus, the face of the tip of the horn, i.e., the second end of the horn, was located immediately above the vestibular opening in the threaded end of the die tip.

The first end 108 of the die housing was sealed by a threaded cap 154 which also served to hold the ultrasonic horn in place. The threads extended upwardly toward the top of the cap a distance of 0.312 inch (about 7.9 mm). The outside diameter of the cap was 2.00 inches (about 50.8 mm) and the length or thickness of the cap was 0.531 inch (about 13.5 mm). The opening in the cap was sized to accommodate the horn; that is, the opening had a diameter of 0.75 inch (about 19.0 mm). The edge of the opening in the cap was a chamfer 156 which was the mirror image of the chamfer at the second end of the die housing. The thickness of the cap at the chamfer was 0.125 inch (about 3.2 mm), which left a space between the end of the threads and the bottom of the chamfer of 0.094 inch (about 2.4 mm), which space was the same as the length of the collar on the horn. The diameter of such space was 1.104 inch (about 28.0 mm). The top 158 of the cap had drilled in it four ¼-inch diameter×¼-inch deep holes (not shown) at 90° intervals to accommodate a pin spanner. Thus, the collar of the horn was compressed between the two chamfers upon tightening the cap, thereby sealing the chamber defined by the die housing.

A Branson elongated aluminum waveguide having an input:output mechanical excitation ratio of 1:1.5 was coupled to the ultrasonic horn by means of a ⅜-inch (about 9.5-mm) stud. To the elongated waveguide was coupled a piezoelectric transducer, a Branson Model 502 Converter, which was powered by a Branson Model 1120 Power Supply operating at 20 kHz (Branson Sonic Power Company, Danbury, Conn.). Power consumption was monitored with a Branson Model A410A Wattmeter.

The stainless steel tubing leading from the reservoir to the die housing and the die housing itself were wrapped with flexible heating tape which secured a thermocouple to each of the tubing and die housing. The reservoir was maintained at a temperature of about 177° C. and the tubing and the die housing were maintained at a temperatures of approximately 190° C. and 260° C., respectively. The temperature of the die tip was about 190° C., as measured with a hand-held pyrometer, a Digi-Sense Type K Digital Thermometer (Cole-Parmer Instrument Company, Niles, Ill.); the temperature of the extruded polymer was found to be about 249° C. A hydraulic pressure of 150 pounds per square inch, gauge (psig) then was applied by the hydraulic ram to the piston. When the flow of molten polymer from the extrusion orifice started, a two-minute mass sample was collected in a tared aluminum sampling pan held about 2 inches (about 5 cm) below the die tip. The sampling pan was reweighed and the flow rate of extruded polymer in grams per minute (g/min.) was calculated. Ultrasonic power then was turned on with the power setting at 100 percent, resulting in an output load of 80 watts. A sample was taken and the flow rate calculated, as before.

When the power to the horn was off, the flow rate was 0.05 g/min. With 100 percent power being applied to the horn the flow rate was 0.345 g/min., even though the extrusion pressure was constant during both experiments. At the same extrusion pressure, the flow rate was increased about 7-fold by the application of ultrasonic energy in accordance with the present invention.

Figure 2:
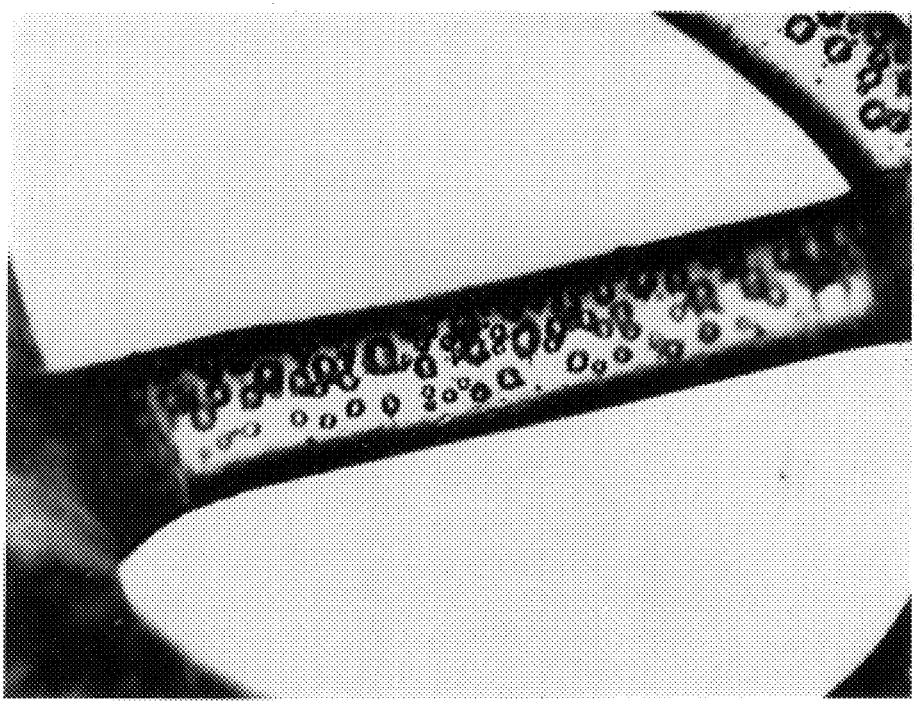
FIGS. 2 and 3 are photomicrographs of fibers prepared in accordance with one embodiment of the method of the present invention, which fibers have bubbles of a gas entrapped therein.
Figure 3:
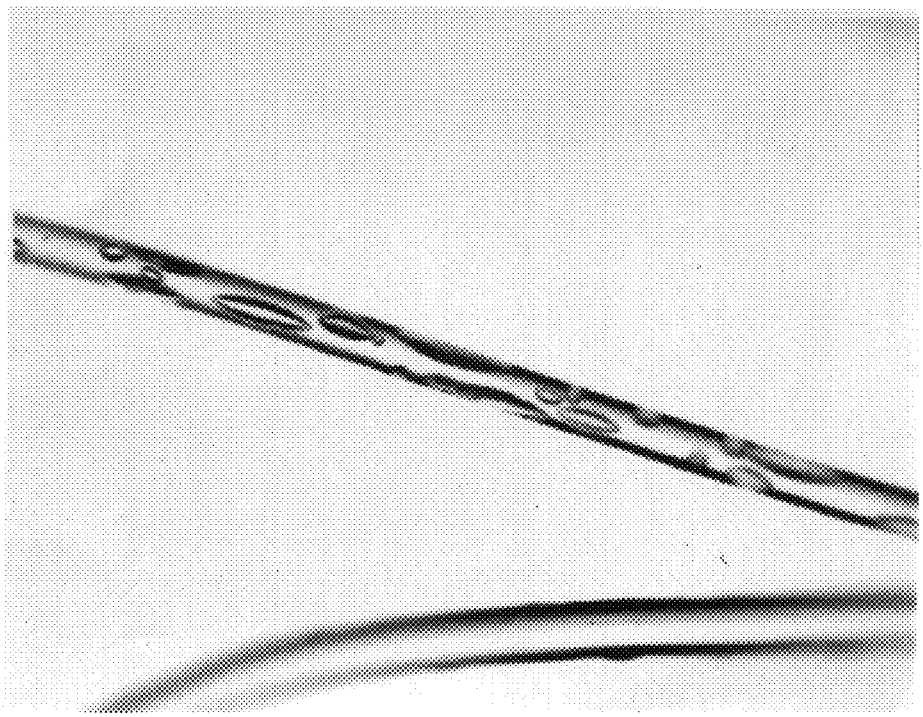

While taking the sample with ultrasonic power applied, it was noted that the reading of the wattmeter was slightly unstable and that changes in the audible harmonics emanating from the horn seemed to match the pattern of power variation. These observations indicated that the extremely low flow rate was allowing cavitation to occur at the horn/polymer interface. Subsequent microscopic examination of the extruded fiber gathered in the sample cup revealed the presence of bubbles within the fiber, evidently formed by the cavitation extraction of gas from the melt. A photomicrograph of the fiber is shown in FIG. 2. In addition, fibers formed under the influence of the ultrasound and drawn by gravity were gathered from a catch pan located approximately 4 feet (about 1.2 meters) below the die tip. A photomicrograph of these fibers, shown in FIG. 3, shows the bubbles entrained within these fibers have been elongated to several times their diameters.

EXAMPLE 2

The procedure of Example 1 was repeated, except that the polymer employed was a polypropylene having a melt flow rate of 30 g/10 min. (Escorene PP-3445, Exxon Chemical Americas, Houston, Tex. 77079) and lacking melt processing additives, and the elongated waveguide was replaced with one having an input:output mechanical excitation ratio of 1:1. In addition, precision hydraulic and pneumatic gauges, as well as a precision air pressure regulator, were added to the extrusion system. Also, a ¼-inch (about 6.4-mm) thick layer of rigid mineral insulation board was attached to the die tip to minimize heat loss.

Six trials were run, with conditions and results being summarized in Table 1. In the table, the "Pressure" column is the hydraulic pressure in psig as described in Example 1, the "Temp." column identifies the temperature of each of the extruder, pipe, and die housing in degrees Celsius as described in Example 1, the "Percent" column under the "Power" heading refers to the percentage of maximum ultrasonic power being applied to the horn, the "Watts" column under the "Power" heading refers to power consumption at a given power setting, and the "Rate" column refers to the flow rate measured for each trial, expressed in g/min.

TABLE 1

Summary of Trials with Escorene PP-3445

| | | | Power | | |
|---|---|---|---|---|---|
| Trial | Pressure | Temp. | Percent | Watts | Rate |
| 1 | 150 | 249 | 0 | 0 | 1.62 |
| | | | 50 | 50 | 1.90 |
| | | | 100 | 80 | 3.50 |
| 2 | 150 | 232 | 0 | 0 | 1.16 |
| | | | 50 | 50 | 1.38 |
| | | | 100 | 80 | 1.74[a] |
| 3 | 150 | 221 | 0 | 0 | 0.44 |
| | | | 50 | 50 | 0.59[a] |
| | | | 100 | 80 | 0.60 |

TABLE 1-continued

Summary of Trials with Escorene PP-3445

| Trial | Pressure | Temp. | Power Percent | Power Watts | Rate |
|---|---|---|---|---|---|
| 4 | 200 | 221 | 0 | 0 | 2.18 |
|  |  |  | 50 | 45 | 2.64[a] |
|  |  |  | 100 | 80 | 4.14[a] |
| 5 | 200 | 232 | 0 | 0 | 1.24 |
|  |  |  | 50 | 45 | 2.50 |
|  |  |  | 100 | 80 | 3.50[a] |
| 6 | 200 | 249 | 0 | 0 | 1.35 |
|  |  |  | 50 | 45 | 2.63 |
|  |  |  | 100 | 80 | 4.35 |

[a]Cavitation and stream disruption (bubble formation).

Because each trial required dismantling the extruder to load the reservoir with polymer, it was difficult to reassemble the extruder without introducing some variations in the tightness of the piston packing gland, the fit of the piston in the barrel, the wrapping of the stainless steel tubing and the die housing with the heating tape, and manual control of the tubing and die housing temperatures. Such variables, as well as others, preclude a rigorous comparison of one trial with another. However, trends within each trial, as well as general trial-to-trial observations, are meaningful.

It is evident that the application of ultrasonic energy increases the flow rate of molten polymer through the extrusion orifice, regardless of extrusion pressure or temperature. The extent of the improvement appears to be a function of both extrusion pressure and temperature. In other words, increasing either pressure or temperature increases flow rate, although the effect of pressure appears to be greater.

EXAMPLE 3

In this example, the constant pressure batch extruder employed in the previous two examples was replaced with a Grid Melter, Model GM-25-1, obtained from J&M Laboratories Inc. of Dawsonville, Ga. The device has the capability to process up to 25 pounds of polymer per hour (about 11 kilograms per hour), and has an integral variable speed gear pump with a displacement of 1.752 cc/revolution. Temperature of the melt is regulated in two zones, premelt and main melt. Pressure is limited and regulated by an internal variable by-pass valve, and indicated by digital readout resolved to increments of 10 psi. Pump drive speed is controlled by a panel mounted potentiometer.

The Grid Melter was used to melt and pressurize the polymers. It eliminated the need for dismantling equipment between trials as required in previous examples. The first polymer used was the Escorene PP-3445 (Trials 1–18, inclusive) and the second was the Himont HH-441 (Trials 19–42, inclusive). Pump drive speed was arbitrarily set at approximately 30 percent of the potentiometer range, and pressure was set and controlled by adjusting the by-pass valve. A 9-inch (about 23-cm) length of ¼-inch (about 6.4-mm) diameter stainless steel tubing was attached from the outlet of the Grid Melter to the inlet of the die housing. The tubing and the extrusion cup were wrapped with heat tape as two zones, and the two zones were set and controlled by automatic heat controllers. All heat zones in both the grid melter and the extrusion apparatus were set to the same point. In addition, the pressure of the Grid Melter was set only at the beginning of each series of trials. The results of the trials are summarized in Tables 2 and 3. In the tables, the "Pressure" column is the Grid Melter pressure in psig, the "Temp." column identifies the temperature set point in degrees Celsius of all heating zones, the "Percent" column under the "Power" heading refers to the percentage of maximum ultrasonic power being applied to the horn, the "Watts" column under the "Power" heading refers to power consumption at a given power setting, and the "Rate" column refers to the flow rate measured for each trial, expressed in g/min.

TABLE 2

Summary of Trials with Escorene PP-3445

| Trial | Pressure | Temp. | Power Percent | Power Watts | Rate |
|---|---|---|---|---|---|
| 1 | 350[a] | 188 | 0 | 0 | 0.76 |
| 2 | 350 | 188 | 30 | 40 | 1.66 |
| 3 | 340 | 188 | 40 | 50 | 2.08 |
| 4 | 340 | 194 | 0 | 0 | 0.76 |
| 5 | 340 | 194 | 30 | 40 | 1.56 |
| 6 | 340 | 194 | 40 | 50 | 2.01 |
| 7 | 350 | 182 | 0 | 0 | 0.68 |
| 8 | 350 | 182 | 30 | 40 | 1.38 |
| 9 | 340 | 182 | 40 | 50 | 1.85 |
| 10 | 420[a] | 182 | 0 | 0 | 0.97 |
| 11 | 420 | 182 | 30 | 38 | 1.78 |
| 12 | 410 | 182 | 40 | 50 | 2.29 |
| 13 | 410 | 188 | 0 | 0 | 1.02 |
| 14 | 400 | 188 | 30 | 40 | 1.84 |
| 15 | 400 | 188 | 40 | 50 | 2.36 |
| 16 | 400 | 194 | 0 | 0 | 1.06 |
| 17 | 390 | 194 | 30 | 40 | 1.96 |
| 18 | 380 | 194 | 40 | 50 | 2.40 |

[a]Initial pressure setting of the Grid Melter.

TABLE 3

Summary of Trials with Himont HH-441

| Trial | Pressure | Temp. | Power Percent | Power Watts | Rate |
|---|---|---|---|---|---|
| 19 | 360[a] | 177 | 0 | 0 | 1.69 |
| 20 | 360 | 177 | 40 | 50 | 3.33 |
| 21 | 340 | 177 | 70 | 75 | 4.69 |
| 22 | 330 | 182 | 0 | 0 | 1.51 |
| 23 | 330 | 182 | 44 | 50 | 3.16 |
| 24 | 320 | 182 | 70 | 75 | 4.75 |
| 25 | 340 | 188 | 0 | 0 | 1.81 |
| 26 | 330 | 188 | 40 | 50 | 3.53 |
| 27 | 320 | 188 | 70 | 75 | 4.93 |
| 28 | 340 | 194 | 0 | 0 | 1.96 |
| 29 | 320 | 194 | 40 | 50 | 3.95 |
| 30 | 310 | 194 | 70 | 75 | 5.14 |
| 31 | 500[a] | 177 | 0 | 0 | 3.42 |
| 32 | 510 | 177 | 40 | 53 | 5.42 |
| 33 | 510 | 177 | 70 | 75 | 7.33 |
| 34 | 500 | 182 | 0 | 0 | 3.96 |
| 35 | 510 | 182 | 40 | 50 | 6.17 |
| 36 | 460 | 182 | 70 | 70 | 7.85 |
| 37 | 500 | 188 | 0 | 0 | 4.47 |
| 38 | 490 | 188 | 40 | 50 | 6.72 |
| 39 | 490 | 188 | 70 | 72 | 9.11 |
| 40 | 510 | 194 | 0 | 0 | 5.51 |
| 41 | 500 | 194 | 40 | 50 | 7.99 |
| 42 | 490 | 194 | 70 | 72 | 10.41 |

[a]Initial pressure setting of the Grid Melter.

Figure 4:
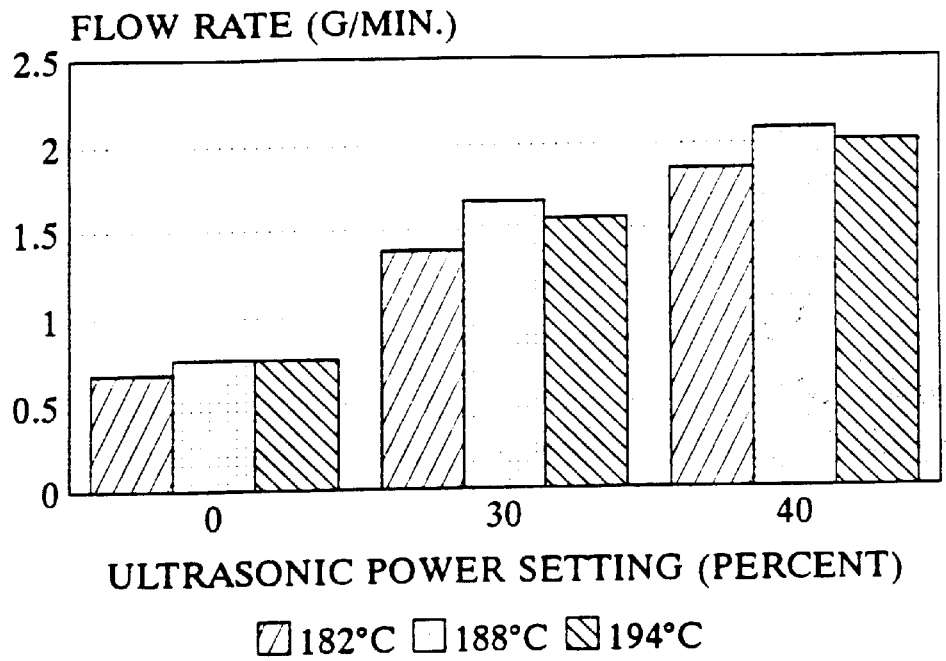
FIGS. 4–8 are plots of polymer flow rates through an orifice at various temperatures without the application of ultrasonic energy and with the application of ultrasonic energy at two different power levels.
Figure 5:
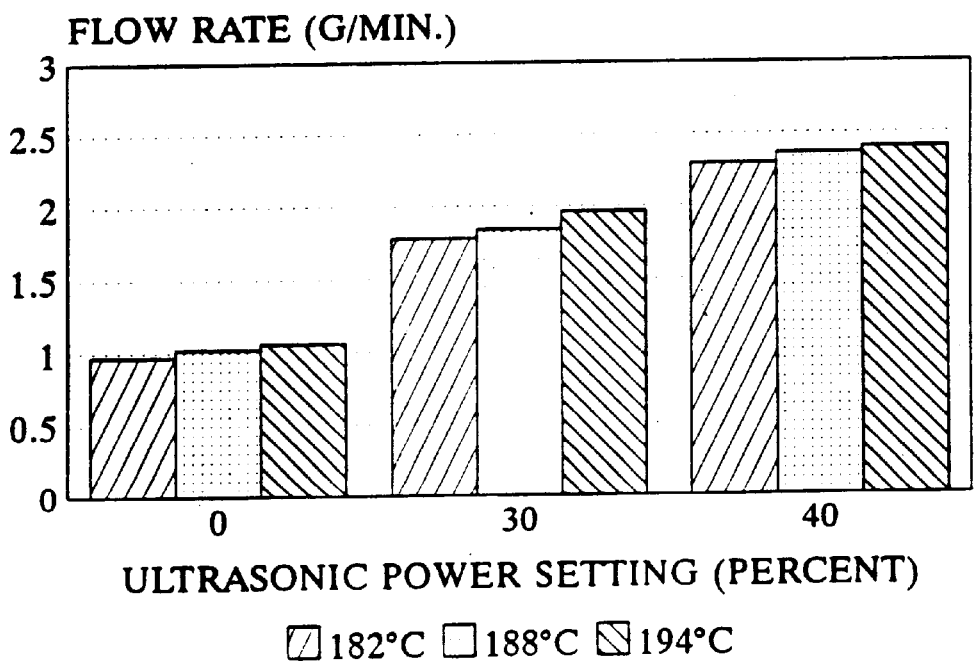
Figure 6:
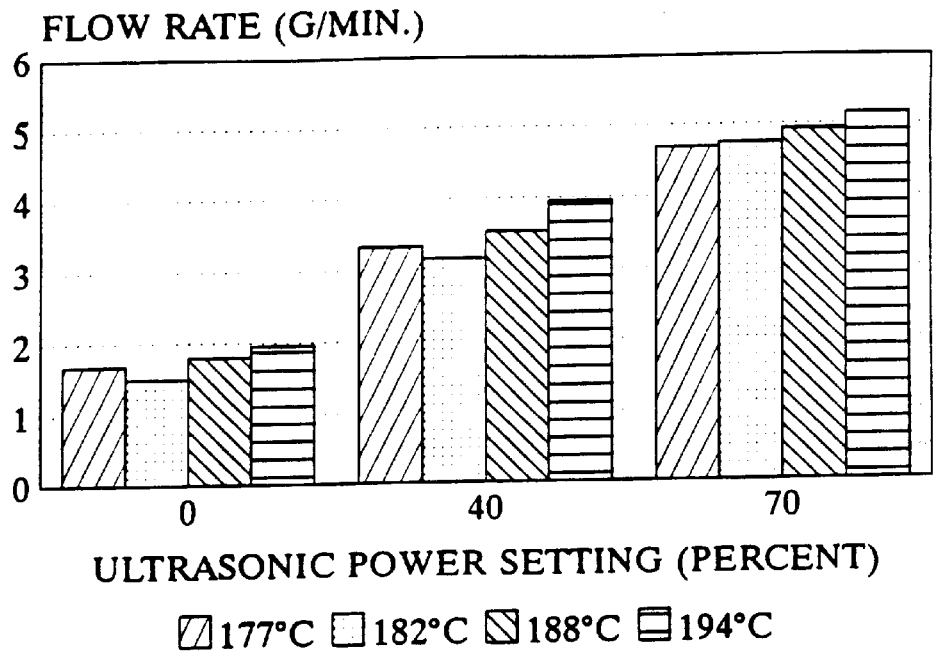
Figure 7:
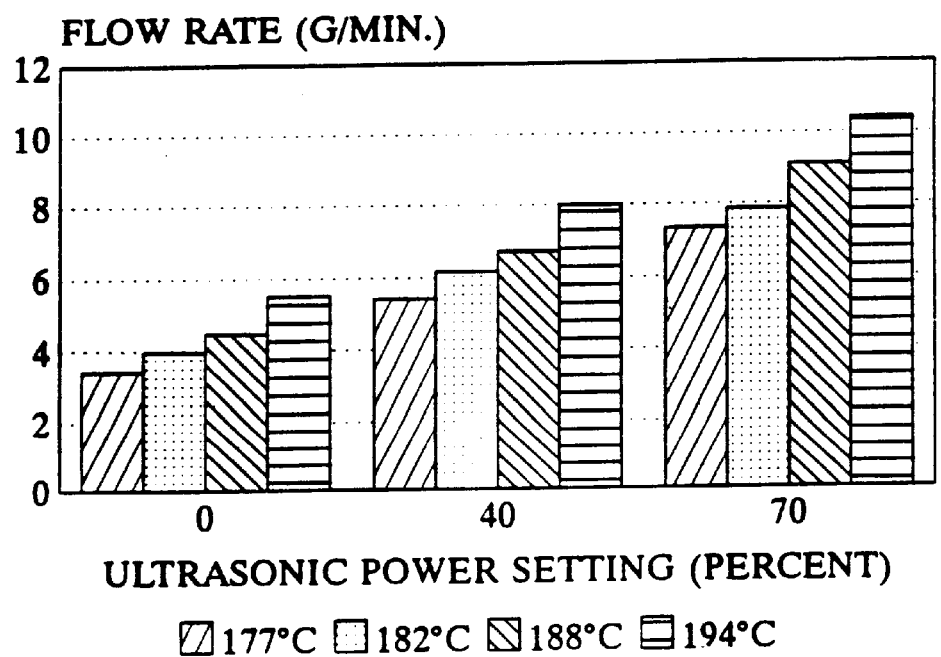
Figure 8:
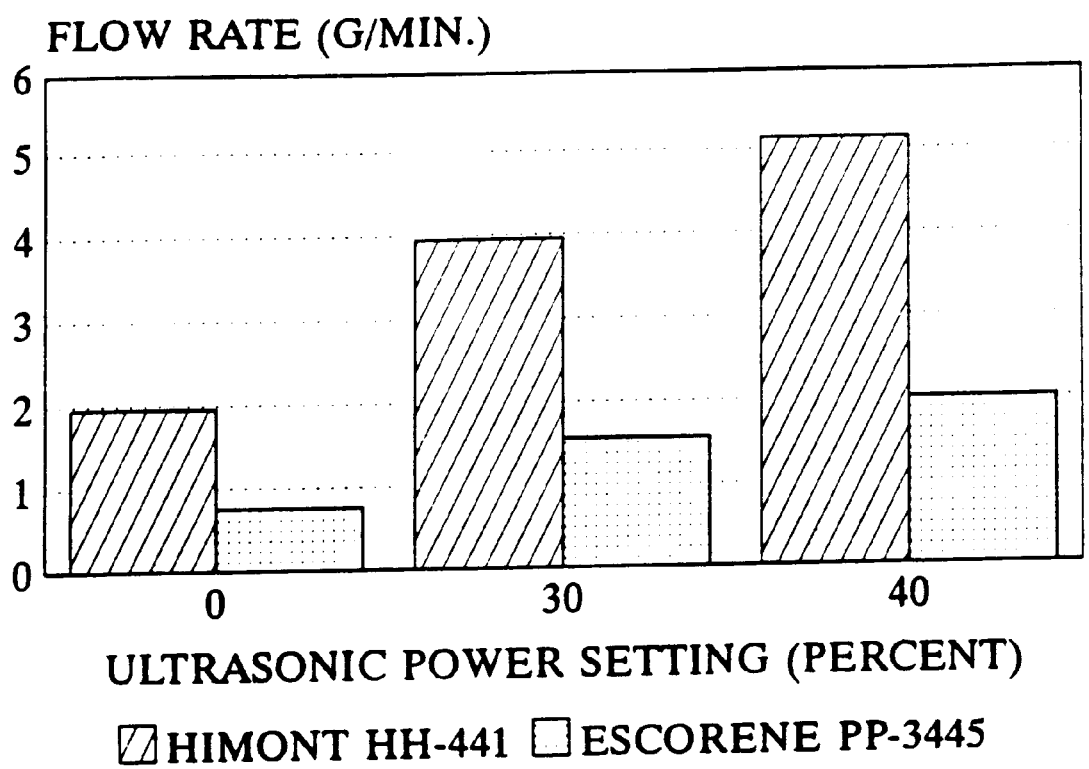

The data in Tables 2 and 3 suggest that the application of ultrasonic energy increases the polymer flow rate through the orifice, regardless of the temperature of the melt, compared to the flow rate without the application of ultrasonic energy. In order to better understand the data, however, the data were plotted as percent ultrasonic power setting versus the observed melt flow rate in grams per minute. The plot for Trials 1–9 (Table 2) is shown in FIG. 4 and the plot for Trials 10–18 (Table 2) is shown in FIG. 5. Similarly, the plots for Trials 19–30 and Trials 31–42 (Table 3) are shown in FIGS. 6 and 7, respectively. Finally, FIG. 8 is a similar plot of the data for Trials 1–3 from Table 2 and Trials 19–21 from Table 3.

FIGS. 4–7, FIGS. 6 and 7 in particular, suggest that increasing ultrasonic power results in essentially linear increases in the observed melt flow rate through the orifice. Moreover, such increases in melt flow rate occurred at each extrusion temperature studied. FIG. 8 demonstrates that the application of ultrasonic energy permits extrusion of a 30 melt flow rate polymer as though it were a 400 melt flow rate polymer without the application of ultrasonic energy. The implication is, of course, that the benefits of lower melt flow rate polymers (i.e., higher molecular weight polymers) can be realized under processing conditions typically employed for higher melt flow rate polymers. Such benefits include, by way of illustration only, the production of fibers having higher melting points and higher tensile strength characteristics. Conversely, the method of the present invention permits extruding a given polymer at a lower temperature without sacrificing throughput.

EXAMPLE 4

This example illustrates the ability of the apparatus of the present invention to remove obstructions which block the extrusion orifice. In this example, the Grid Melter hopper was filled with a quantity of an experimental pressure-sensitive hot melt adhesive, HL-1295 ZP, obtained from the H. B. Fuller Company of St. Paul, Minn. The recommended application temperature for the resin was 149° C. The heat zones in the melter, tubing, and die housing initially were set at 138° C. When heat levels stabilized, the pump drive was started at about 15 percent of total speed, and a pressure of 450 psig was developed. No ultrasonic power was used at this point. The temperature of all zones then was increased to approximately 194° C., or 27° C. above the recommended application temperature of the resin. The extrusion pressure stabilized at about 130 psig. The extrudate at this point smelled burned and was smoking. Within five minutes the flow stopped, and the extrusion pressure rose to over 400 psig. At this point the ultrasonic power controller was set to 50 percent and the power was turned on for one second. Flow immediately resumed and the pressure dropped to the former level. Particles of black charred materials could be seen in the extrudate. Within three minutes the flow stopped again and was restarted with an application of ultrasonic energy as before. This cycle was repeated eight more times. After each repetition the power control was turned down slightly; after the last cycle the power control setting was at 30 percent power, which resulted in a wattmeter reading of 35 watts. The power supply was left on at the 30 percent level and flow observed for one hour. Charred particles could be seen within the extrudate, but flow was uninterrupted for the course of the trial.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. An apparatus for extruding a pressurized molten thermoplastic polymer, the apparatus comprising:
   a die housing defining a chamber, an inlet orifice and an extrusion orifice;
   said inlet orifice being connectable to an external source of the pressurized molten thermoplastic polymer and being in communication with said chamber to supply the pressurized molten thermoplastic polymer thereto;
   said chamber adapted to receive said pressurized molten thermoplastic polymer from said inlet orifice and being in communication with said extrusion orifice to define a direct polymer flow path therebetween;
   said extrusion orifice defined by the walls of a die tip, the extrusion orifice being adapted to receive the pressurized molten thermoplastic polymer from the chamber and pass the polymer out of the die housing; and
   a means for applying ultrasonic energy to a location within the polymer flow path as the pressurized molten thermoplastic polymer moves therealong without applying ultrasonic energy directly to the die tip, wherein the means for applying ultrasonic energy is located within the chamber and is free from direct vibrational communication with the die tip.

2. The apparatus of claim 1, in which the ultrasonic energy has a frequency of from about 18 kHz to about 60 kHz.

3. An apparatus for extruding a pressurized molten thermoplastic polymer, the apparatus comprising:
   a die housing having a first end and a second end and defining a chamber, an inlet orifice and an extrusion orifice;
   said inlet orifice being connectable to an external source of the pressurized molten thermoplastic polymer and being in communication with said chamber to supply the pressurized molten thermoplastic polymer thereto;
   said chamber adapted to receive pressurized molten thermoplastic polymer from said inlet orifice and being in communication with said extrusion orifice to define a direct polymer flow path therebetween;
   said extrusion orifice defined by the walls of a die tip, the extrusion orifice being located in the first end of the die housing and adapted to receive the pressurized molten thermoplastic polymer from the chamber and pass the polymer out of the die housing along a first axis; and
   an ultrasonic horn having a first end and a second end and adapted, upon excitation by ultrasonic energy, to have a node and a longitudinal mechanical excitation axis, the horn being located in the second end of the die housing in a manner such that the first end of the horn is located outside the die housing and the second end of the horn is located inside the die housing, within the chamber, and is in close proximity to the extrusion orifice but is free from direct vibrational communication with the die tip.

4. The apparatus of claim 3, in which the ultrasonic energy has a frequency of from about 18 kHz to about 60 kHz.

5. The apparatus of claim 3, in which the extrusion orifice is adapted to pass polymer out of the die housing to form a threadline that can be attenuated into a fiber.

6. The apparatus of claim 3, in which the longitudinal mechanical excitation axis of said ultrasonic horn is substantially parallel with the first axis.

7. The apparatus of claim 3, in which said die tip defines a minimum area encompassing said extrusion orifice, the second end of the ultrasonic horn having a cross-sectional area approximately the same as or less than said minimum area.

8. The apparatus of claim 3, in which the ultrasonic horn has coupled to the first end thereof a vibrator means as a source of longitudinal mechanical excitation.

9. The apparatus of claim 8, in which the vibrator means is a piezoelectric transducer.

10. The apparatus of claim 9, in which the piezoelectric transducer is coupled to the ultrasonic horn by means of an elongated waveguide.

11. The apparatus of claim 10, in which the elongated waveguide has an input:output mechanical excitation ratio of from about 1:1 to about 1:2.5.

12. An apparatus for extruding a pressurized molten thermoplastic polymer, the apparatus comprising:

a die housing defining a chamber, an inlet orifice and an extrusion orifice;

said inlet orifice being connectable to an external source of the pressurized molten thermoplastic polymer and being in communication with said chamber to supply the pressurized molten thermoplastic polymer thereto;

said chamber adapted to receive said pressurized molten thermoplastic polymer from said inlet orifice and being in communication with said extrusion orifice to define a direct polymer flow path therebetween;

said extrusion orifice defined by the walls of a die tip, the extrusion orifice being adapted to receive the pressurized molten thermoplastic polymer from the chamber and pass the polymer out of the die housing to form a threadline that can be attenuated into a fiber; and a means for applying ultrasonic energy to a location within the polymer flow path as the pressurized molten thermoplastic polymer moves therealong without applying ultrasonic energy directly to the die tip, wherein the means for applying ultrasonic energy is located within the chamber and is free from direct vibrational communication with the die tip.

13. The apparatus of claim 12, in which the ultrasonic energy has a frequency of from about 18 kHz to about 60 kHz.

14. The apparatus of claim 12, in which the means for applying ultrasonic energy has a longitudinal mechanical excitation axis situated to be substantially parallel with the first axis.

15. The apparatus of claim 12, in which said die tip defines a minimum area encompassing said extrusion orifice, and further wherein said means for applying ultrasonic energy is an ultrasonic horn having a cross-sectional area at said location in the polymer flow path where said ultrasonic energy is applied approximately the same as or less than said minimum area.

16. The apparatus of claim 12, in which the means for applying ultrasonic energy is an ultrasonic horn having a vibrator means coupled to a first end thereof as a source of longitudinal mechanical excitation.

17. The apparatus of claim 16, in which the vibrator means is a piezoelectric transducer.

18. The apparatus of claim 17, in which the piezoelectric transducer is coupled to the ultrasonic horn by means of an elongated wave guide.

19. The apparatus of claim 18, in which the elongated waveguide has an input:output mechanical excitation ratio of from about 1:1 to about 1:2.5.

20. The apparatus of claim 3, in which the die tip defines a plurality of extrusion orifices encompassed by a minimum area, said second end of said ultrasonic horn having a cross-sectional area approximately the same as or less than said minimum area.

21. The apparatus of claim 12, in which the die tip defines a plurality of extrusion orifices encompassed by a minimum area, said means for applying ultrasonic energy has a cross-sectional area at said location in the polymer flow path where said ultrasonic energy is applied that is approximately the same as or less than said minimum area.

* * * * *